No. 894,785. PATENTED JULY 28, 1908.
L. E. WATERMAN.
WHEELED PLOW.
APPLICATION FILED OCT. 22, 1906.
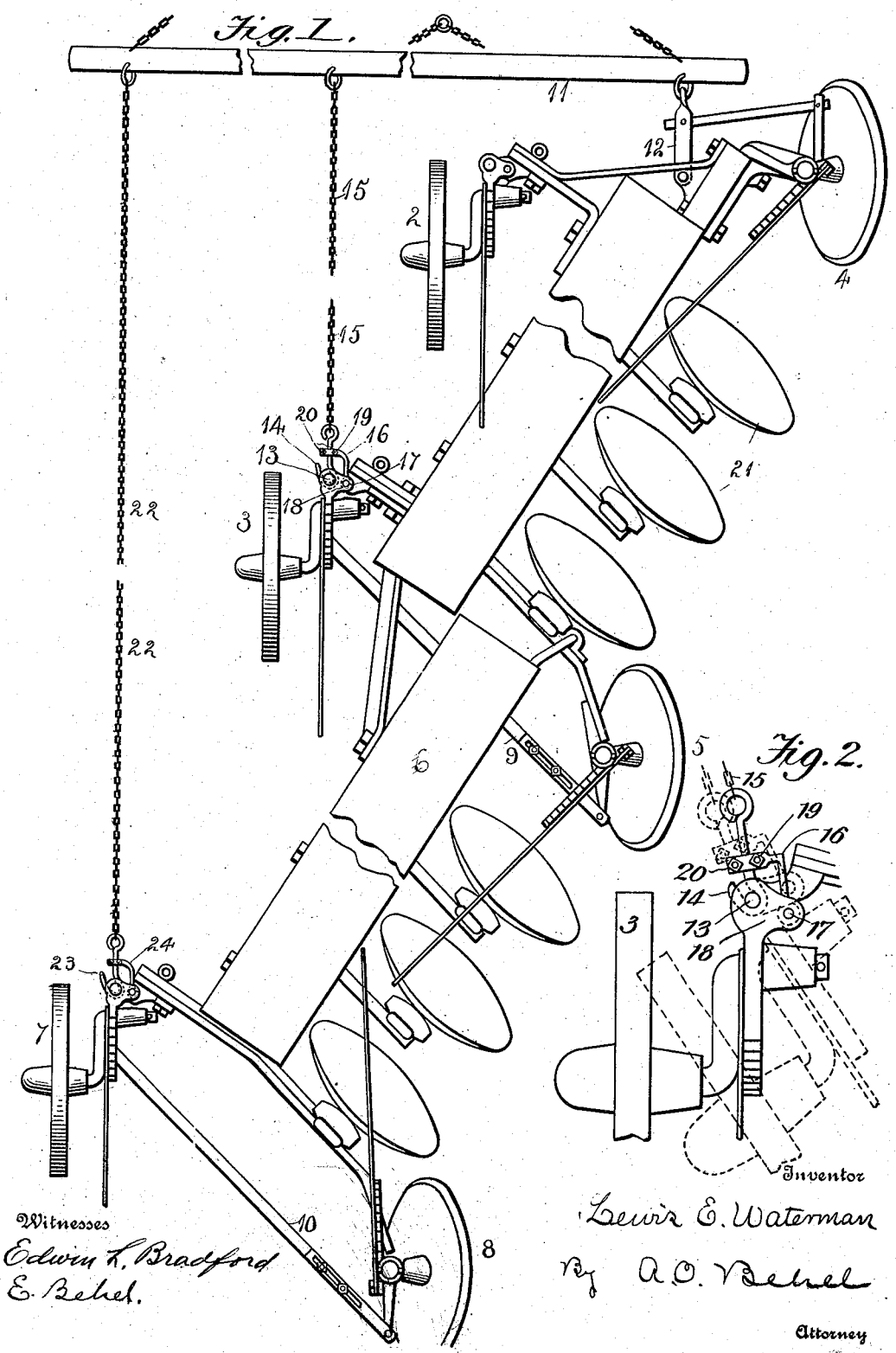

UNITED STATES PATENT OFFICE.

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

WHEELED PLOW.

No. 894,785.  Specification of Letters Patent.  Patented July 28, 1908.

Application filed October 22, 1906. Serial No. 339,978.

*To all whom it may concern:*

Be it known that I, LEWIS E. WATERMAN, a citizen of the United States, residing at Rockford, in the county of Winnebago and State of Illinois, have invented certain new and useful Improvements in Wheeled Plows, of which the following is a specification.

The object of this invention is to form a direct connection between a land-wheel and the draft, in order that the land-wheel may be held to the land more or less, to counteract the pressure of the ground against the disks.

In the accompanying drawings, Figure 1 shows a plan view of a wheeled plow containing my improvements. Fig. 2 is an enlarged view of the land wheel support, one position being shown in dotted lines.

The wheeled plow shown in the drawings, in the main, is of a construction patented to me June 12, 1906, No. 823,244. The plow in this instance is of two sections connected together. The main frame 1 of the forward section is supported by the land-wheels 2 and 3, and two furrow-wheels 4 and 5. The main frame 6 has a land-wheel 7, and a furrow-wheel 8 connected to it. The land-wheel 3 and furrow-wheel 5 of the forward section are connected by the link 9, said link being in two sections and adjustably connected. The land-wheel 7 and furrow-wheel 8 of the rear section are connected by a link 10, said link being in two sections and adjustably connected. The land-wheels 3 and 7 and the furrow-wheels 5 and 8 each have a pivotal connection with their supports. A draft-bar 11 has a connection with the forward end of the front section of the link 12.

Around the pivotal point 13 of the land-wheel 3 is placed a hook 14, and the other end of the hook has a connection with the draft-bar by the chain 15. A link 16 has one end 17 pivotally connected to a projection 18 extending from a part movable with the land-wheel. The other end of this link has a connection with the hook 14 by a U bolt 19 surrounding the hook and nuts 20 turned in connection with the screw-threaded ends of the U bolt. This U bolt clamps the link 16 in connection with the hook. By adjusting the free end of the link 16 in connection with the hook 14, but toward the pivot of the hook, the land-wheel will be turned and held so that its tendency is to run toward the plowed-land thereby assisting to resist the pressure of the earth against the disks 21. As the land-wheel 3 and furrow-wheel 5 are connected by the link 9 any influence the draft may exert over the land-wheel will be exerted over the furrow-wheel. By the link 9 being in two sections and lengthwise adjustable, the relative positions of the land-wheel 3 and furrow-wheel 5 can be adjusted to give the best results.

The land-wheel 7 has a link connection with the draft-bar 11 by the chain 22, hook 23 and link 24.

I claim as my invention.

1. In a wheeled plow, the combination of a main frame, a plowing attachment supported by the main frame, a series of wheels supporting the main frame, one of the wheels being a land wheel, the land wheel pivotally connected to the main frame, a draft bar, a connection between the land wheel support and draft bar and adjustable means in connection with the draft connection for varying the position of the land wheel laterally with respect to the line of draft.

2. In a wheeled plow, the combination of a main frame, a land wheel support having a pivotal connection with the main frame, a land wheel located in connection with its support, a draft bar, a link pivotally connected with the land wheel support, a connection between the link and draft bar, and a link having a pivotal connection with the land wheel support and an adjustable connection with the first named link.

LEWIS E. WATERMAN.

Witnesses:
 A. O. BEHEL,
 E. BEHEL.